(12) United States Patent
Argue et al.

(10) Patent No.: US 9,449,340 B2
(45) Date of Patent: Sep. 20, 2016

(54) METHOD AND SYSTEM FOR MANAGING AN ELECTRONIC SHOPPING LIST WITH GESTURES

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 756 days.

(21) Appl. No.: 13/754,659

(22) Filed: Jan. 30, 2013

(65) Prior Publication Data

US 2014/0214597 A1    Jul. 31, 2014

(51) Int. Cl.
| | | |
|---|---|---|
| G06Q 30/00 | (2012.01) | |
| G09G 5/00 | (2006.01) | |
| G06F 3/048 | (2013.01) | |
| G06Q 30/06 | (2012.01) | |
| G06F 3/01 | (2006.01) | |

(52) U.S. Cl.
CPC .......... *G06Q 30/0633* (2013.01); *G06F 3/011* (2013.01); *G06F 3/017* (2013.01)

(58) Field of Classification Search
USPC ...................................... 705/26.1
See application file for complete search history.

(56) References Cited

U.S. PATENT DOCUMENTS

| | | | | |
|---|---|---|---|---|
| 6,026,376 A * | 2/2000 | Kenney | ................... | G06Q 30/06 705/26.61 |
| 7,564,469 B2 * | 7/2009 | Cohen | ................... | A63F 13/10 345/158 |
| 7,893,935 B1 * | 2/2011 | Neely, III | ............... | G06F 3/011 345/419 |
| 8,179,604 B1 * | 5/2012 | Prada Gomez | .... | G02B 27/0093 345/8 |
| 8,384,005 B2 * | 2/2013 | Jung | ...................... | G03B 21/00 250/208.1 |
| 8,532,675 B1 * | 9/2013 | Pasquero | .......... | H04M 1/72572 345/158 |
| 8,589,824 B2 * | 11/2013 | Hillis | ...................... | G06F 3/017 382/103 |
| 8,606,645 B1 * | 12/2013 | Applefeld | .............. | G06Q 30/02 705/14.25 |
| 8,751,215 B2 * | 6/2014 | Tardif | ...................... | G06F 3/017 704/2 |
| 2002/0030637 A1 * | 3/2002 | Mann | ................... | G02B 27/017 345/8 |

(Continued)

*Primary Examiner* — Ashford S Hayles
(74) *Attorney, Agent, or Firm* — Howard & Howard Attorneys PLLC (57) ABSTRACT

A computer-implemented method is disclosed herein. The method includes the step of receiving, with a processing device of a commerce server, one or more shopping list signals from an electronic computing device to establish a shopping list of a plurality of items offered for sale in a retail store. The method also includes the step of transmitting, with the processing device, a first item signal to an augmented reality device worn by a consumer within the retail store. The first item signal corresponds to one of the plurality of items. The method also includes the step of receiving, with the processing device, one or more movement signals from the augmented reality device worn by the consumer corresponding to movement of the consumer. The method also includes the step of changing, with the processing device, from transmitting the first item signal to transmitting a second item signal different from the first item signal in response to the step of receiving the one or more movement signals.

10 Claims, 5 Drawing Sheets

(56) References Cited

U.S. PATENT DOCUMENTS

| | | | |
|---|---|---|---|
| 2002/0094189 A1* | 7/2002 | Navab | H04N 19/27 348/207.99 |
| 2003/0009394 A1* | 1/2003 | Malkin | G06Q 20/20 705/27.2 |
| 2003/0154135 A1* | 8/2003 | Covington | G06Q 30/00 705/26.8 |
| 2004/0119662 A1* | 6/2004 | Dempski | G01S 3/7864 345/8 |
| 2004/0164926 A1* | 8/2004 | Schonlau | G02B 27/017 345/8 |
| 2004/0183751 A1* | 9/2004 | Dempski | G02B 27/017 345/8 |
| 2005/0131776 A1* | 6/2005 | Perotti | G06Q 30/0643 705/27.2 |
| 2006/0048092 A1* | 3/2006 | Kirkley | A63F 13/10 717/100 |
| 2008/0043013 A1* | 2/2008 | Gruttadauria | G06Q 30/02 345/419 |
| 2008/0071559 A1* | 3/2008 | Arrasvuori | G06Q 30/06 705/26.1 |
| 2009/0182499 A1* | 7/2009 | Bravo | G01C 21/20 701/408 |
| 2009/0189974 A1* | 7/2009 | Deering | G09G 3/02 348/46 |
| 2009/0285483 A1* | 11/2009 | Guven | G06Q 30/016 382/181 |
| 2009/0287587 A1* | 11/2009 | Bloebaum | G01S 5/0205 705/26.8 |
| 2010/0121480 A1* | 5/2010 | Stelzer | B65G 1/137 700/215 |
| 2010/0265311 A1* | 10/2010 | Carpenter, Jr. | G06Q 10/00 348/14.08 |
| 2011/0173204 A1* | 7/2011 | Murillo | G06F 3/017 707/741 |
| 2011/0246064 A1* | 10/2011 | Nicholson | G01C 21/00 701/467 |
| 2011/0246329 A1* | 10/2011 | Geisner | G06F 3/017 705/27.1 |
| 2012/0017147 A1* | 1/2012 | Mark | G06F 1/1639 715/702 |
| 2012/0019557 A1* | 1/2012 | Aronsson | G06T 11/00 345/633 |
| 2012/0019645 A1* | 1/2012 | Maltz | G02B 7/287 348/78 |
| 2012/0062596 A1* | 3/2012 | Bedi | G06Q 30/0256 345/633 |
| 2012/0092328 A1* | 4/2012 | Flaks | G02B 27/017 345/419 |
| 2012/0121185 A1* | 5/2012 | Zavesky | G06F 3/005 382/195 |
| 2012/0195460 A1* | 8/2012 | Lawrence Ashok Inigo | G06T 19/006 382/103 |
| 2012/0204307 A1* | 8/2012 | De Mattei | A41D 1/002 2/69 |
| 2012/0229625 A1* | 9/2012 | Calman | G06Q 30/00 348/135 |
| 2012/0233003 A1* | 9/2012 | Calman | G06Q 30/06 705/16 |
| 2012/0259744 A1* | 10/2012 | Ganesh | G06Q 30/00 705/27.2 |
| 2012/0275686 A1* | 11/2012 | Wilson | G06K 9/00355 382/154 |
| 2012/0293548 A1* | 11/2012 | Perez | G06T 19/006 345/633 |
| 2013/0046648 A1* | 2/2013 | Calman | G06Q 30/08 705/26.3 |
| 2013/0083003 A1* | 4/2013 | Perez | G06F 3/005 345/419 |
| 2013/0083018 A1* | 4/2013 | Geisner | G06F 3/011 345/420 |
| 2013/0083064 A1* | 4/2013 | Geisner | G06F 17/30047 345/633 |
| 2013/0117377 A1* | 5/2013 | Miller | H04L 67/38 709/205 |
| 2013/0125027 A1* | 5/2013 | Abovitz | G06F 3/011 715/757 |
| 2013/0138534 A1* | 5/2013 | Herwig | G06Q 30/0623 705/26.62 |
| 2013/0179303 A1* | 7/2013 | Petrou | G06Q 30/0623 705/26.61 |
| 2013/0293468 A1* | 11/2013 | Perez | G06F 3/033 345/158 |
| 2013/0293577 A1* | 11/2013 | Perez | G02B 27/017 345/633 |
| 2013/0293580 A1* | 11/2013 | Spivack | G06Q 30/0643 345/633 |
| 2013/0342564 A1* | 12/2013 | Kinnebrew | G09G 3/003 345/619 |
| 2013/0342571 A1* | 12/2013 | Kinnebrew | G06F 3/147 345/633 |
| 2014/0028539 A1* | 1/2014 | Newham | G06F 1/1694 345/156 |
| 2014/0098134 A1* | 4/2014 | Fein | G06T 11/60 345/633 |
| 2014/0100997 A1* | 4/2014 | Mayerle | G06Q 30/0643 705/27.2 |
| 2014/0101555 A1* | 4/2014 | Fein | G06F 3/048 715/733 |
| 2014/0111542 A1* | 4/2014 | Wan | G06F 17/30253 345/633 |
| 2014/0147829 A1* | 5/2014 | Jerauld | G06F 1/163 434/430 |
| 2014/0168264 A1* | 6/2014 | Harrison | G02B 27/0176 345/633 |
| 2015/0012426 A1* | 1/2015 | Purves | G06Q 30/0623 705/41 |

* cited by examiner

FIGURE 5

METHOD AND SYSTEM FOR MANAGING AN ELECTRONIC SHOPPING LIST WITH GESTURES

BACKGROUND INFORMATION

1. Field of the Disclosure

The present invention relates generally to providing a shopping list to a consumer that can be created and manipulated electronically. In particular, a consumer can use and update the electronic shopping list with commands that are transmitted through an augmented reality device.

2. Background

Some retail stores extend across tens of thousands of square feet and offer thousands of products for sale. Many consumers visit such retail stores when shopping for products such as groceries, office supplies, and household wares. Typically, these stores can have dozens of aisles and/or departments. Accordingly, traversing these aisles looking for specific products may be a challenging experience. Shopping lists can assist a consumer in focusing on the items to purchase, to complete a shopping trip successfully and efficiently. However, shopping lists can be difficult to manage while the consumer is traversing the store looking for products and avoiding other consumers. The consumer often needs to grasp and consider products, making it difficult to maintain the shopping list in-hand and even more difficult to maintain both the shopping list and a writing instrument in-hand.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

Embodiments of the present disclosure can assist a consumer shopping in a retail store. An embodiment of the present disclosure can assist a consumer in managing a shopping list to help the consumer shop more efficiently. An embodiment of the present disclosure can help reduce the stress that can arise while shopping and thus make the shopping trip more enjoyable.

A shopping list management system according to some embodiments of the present disclosure can be operable to receive one or more shopping list signals from an electronic computing device in order to establish a shopping list for a consumer. A shopping list can include a plurality of items that are offered for sale in a retail store. The shopping list can be completed and transmitted to a commerce server of the shopping list management system. The shopping list can be transmitted as a single shopping list signal, wherein a "single" shopping list signal contains the identities of a plurality of items. Alternatively, the shopping list can be established item-by-item with a plurality of shopping list signals, wherein each item is individually communicated to the commerce server. It is also noted that a shopping list management system can be flexible in where it resides; portions of the system can reside on the server, or the electronic computing device, or on some combination thereof. Further, shopping list data could be stored remotely, local, or some combination of remotely and locally.

The shopping list can be generated with an electronic computing device possessed by the consumer. An electronic computing device used by a consumer can be a laptop computer, a desktop computer, a smart-phone, a tablet, an e-reader, or any other electronic computing device operable to generate and transmit a shopping list signal.

A shopping list management system according to some embodiments of the present disclosure can be operable to transmit a first item signal to an augmented reality device worn by a consumer within the retail store. The first item signal can correspond to one of the plurality of items on the consumer's shopping list. For example, as the consumer begins to shop or continues to shop, the shopping list management system can transmit an item signal to the augmented reality device reminding the consumer of the next item to acquire. The augmented reality device can include a display and receipt of the item signal can result in a change of the appearance of the display. For example, receipt of the item signal can result in the name of the next item to purchase being displayed on the display of the augmented reality device.

A shopping list management system according to some embodiments of the present disclosure can be operable to receive one or more movement signals from the augmented reality device worn by the consumer. The movement signals can be processed with a movement module of the commerce server in some embodiments of the disclosure. A movement signal is indicative of movement by the consumer. In some embodiments of the disclosure, a movement signal is indicative of a gesture by a consumer. A gesture is a movement or a change of position of the hand, arm, or head that is expressive of a command. Examples of gestures can include nodding of the head (such as to indicate yes) or pivoting of the head (such as to indicate no). A single nod or pivot of the head can suffice to define a gesture detected by the augmented reality device. Examples of gestures can also include movements executed by a hand, such as swiping (side-to-side), dragging (up-down), or rotating of the finger tips. The augmented reality device can include sensors configured to detect consumer movement that is indicative of a gesture.

A shopping list management system according to some embodiments of the present disclosure can be operable to change from transmitting the first item signal to transmitting a second item signal different from the first item signal in response to receiving one or more movement signals. For example, the shopping list management system can transmit the first item signal to help the consumer focus on the "first" or current item to acquire. When the consumer acquires the first item, the consumer can execute a gesture detectable by the augmented reality device. The execution of the gesture can be sensed or perceived by a sensor and/or component of the augmented reality device. In response to detecting the gesture, the augmented reality device can transmit a movement signal to the shopping list management system. Upon receipt of the movement signal, the shopping list management system can switch the item signal being transmitted to the augmented reality device from a first item signal to a second item signal. The second item signal corresponds to the next item from the shopping list to acquire. Thus, the consumer can manipulate the shopping list through gesturing.

In some embodiments of the present disclosure, different gestures can correspond to different commands that will be executed by shopping list management system. By way of example and not limitation, a nod by the consumer can result in the current item, the item associated with the first item signal, being removed from the shopping list. Alternatively, in some embodiments of the present disclosure, pivoting of the head by the consumer can result in the current item being retained in the shopping list but replaced by another item as the current or "first" item signal. This feature can be desirable if the consumer decides to suspend the pursuit of one item in favor of another item. Alternatively, in some embodiments of the present disclosure, a swiping motion of the hand in front of a camera of the augmented reality device can result in the current item being taken off the shopping list. Other gestures can be associated with other commands for managing a shopping list.

Embodiments of the present disclosure provide numerous benefits to consumers. Embodiments of the present disclosure allow a consumer to execute a shopping list while freeing the consumer's hands for other purposes. Also, the shopping list can be manipulated without speaking in some embodiments of the present disclosure. A retail store can include numerous consumers speaking and other sources of noise than can compromise the effectiveness of a shopping list manipulated through voice commands. Some embodiments of the present disclosure can allow the consumer to manage a shopping list without communicating commands verbally.

Figure 1:
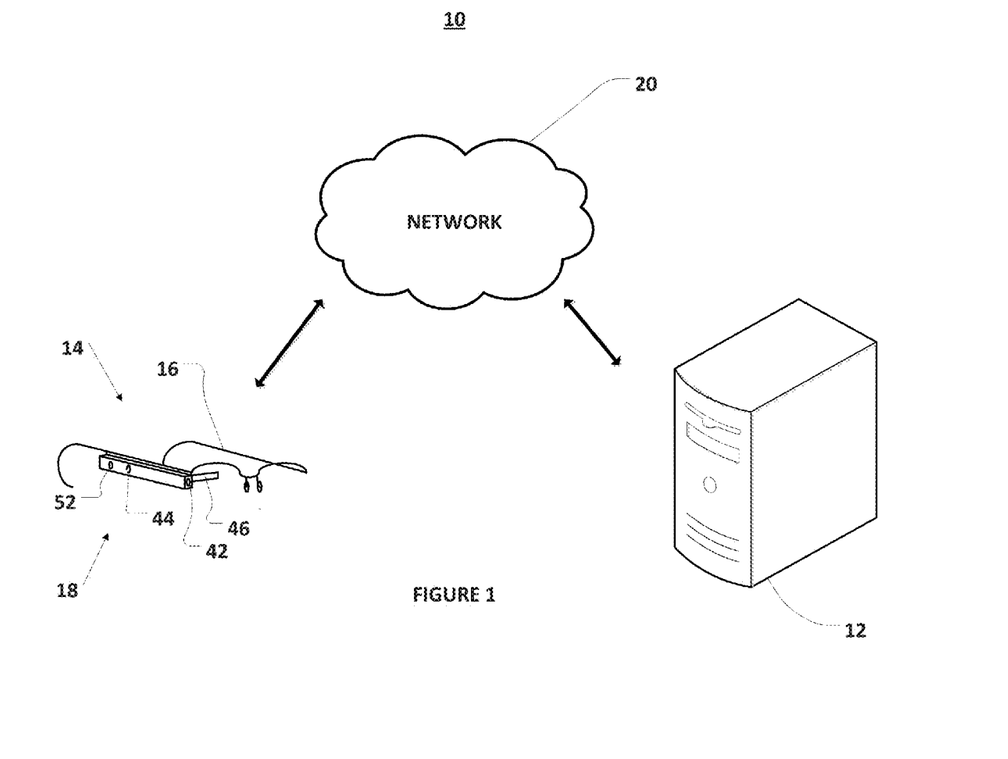
FIG. 1 is an example schematic illustrating a system according to some embodiments of the present disclosure.

FIG. 1 is a schematic illustrating a shopping list management system 10 according to some embodiments of the present disclosure. The shopping list management system 10 can implement a computer-implemented method that includes the step of receiving, with a commerce server 12, one or more shopping list signals from a consumer. A single shopping list signal can contain a shopping list. A shopping list can be a plurality of items offered for sale at a retail store that the consumer intends to purchase. Alternatively, a shopping list can be created item-by-item, wherein an individual signal for each item is communicated to the commerce server 12 and the commerce server 12 aggregates the items into a shopping list.

The one or more shopping list signals can be communicated to the commerce server 12 with an electronic computing device possessed by the consumer. The one or more shopping list signals can be communicated from a location that is remote from the retail store or that is within the retail store. The one or more shopping list signals can also be communicated from a kiosk located within the retail store, wherein the kiosk houses an electronic computing device. The one or more shopping list signals can also be communicated with an augmented reality device worn by the consumer, such as a head mountable unit 14.

The head mountable unit 14 can be worn by a consumer while the consumer is shopping within the retail store. In the illustrated embodiment of FIG. 1, the exemplary head mountable unit 14 includes a frame 16 and a communications unit 18 supported on the frame 16.

Signals transmitted by the head mountable unit 14 and received by the commerce server 12, and vice-versa, can be communicated over a network 20. As used herein, the term "network" can include, but is not limited to, a Local Area Network (LAN), a Metropolitan Area Network (MAN), a Wide Area Network (WAN), the Internet, or combinations thereof. Embodiments of the present disclosure can be practiced with a wireless network, a hard-wired network, or any combination thereof.

The commerce server 12 can transmit a first or current item signal to the head mountable unit 14. The first item signal corresponds to one of the plurality of items on the shopping list. In some embodiments of the present disclosure, the first item signal can correspond to the item that appears at the top of the shopping list. The order of the shopping list can be based on the order that the consumer added items to the shopping list. However, the first item signal is not required to correspond to the item at the top of the shopping list (the first last item the consumer added to the shopping list). The term "first" is used merely to distinguish the current item being pursued from a subsequent item. In some embodiments of the present disclosure, the item selected as the first or current item can correspond to the item that is physically closest to the consumer.

The item signal transmitted by the commerce server 12 can be conveyed to the consumer through a visual message displayed on a display 46 of head mountable unit 14. The visual message resulting from the item signal can be continuously displayed until the consumer indicates that that item is acquired or until the consumer desires that another item signal be transmitted. Alternatively, the visual message resulting from the item signal can be displayed intermittently as the consumer travels to the location of the item in the retail store.

The commerce server 12 can receive one or more movement signals from the head mountable unit 14. A movement signal corresponds to movement of the consumer that is indicative of a gesture. The augmented reality device can include sensors configured to detect consumer movement indicative of a gesture. The augmented reality device can include components that are configured to reveal the execution of a gesture. The capacity of the head mountable unit 14 to detect gestures by the consumer is set forth in greater detail below.

The detection of a gesture by the head mountable unit 14 can be transmitted to the commerce server 12 as a movement signal. The movement signal can be transmitted over the network 20. It is noted that in some embodiments movement can be detected by the commerce server 12 based on signals transmitted by the head mountable unit 14; for example, the commerce server 12 can monitor changes in a position signal emitted by the head mountable unit 14 and detect movement based on a change in the position signal. In response to receiving a movement signal or detecting movement, the commerce server 12 can change the transmission of the item signal, from transmitting the first item signal to transmitting a second item signal different from the first item signal. The second item signal can correspond to the next item for the consumer to pursue in the retail store. The next item selected by the commerce sever 12 can be selected based on proximity, the order of items added to the shopping list, or any other consideration.

Figure 2:
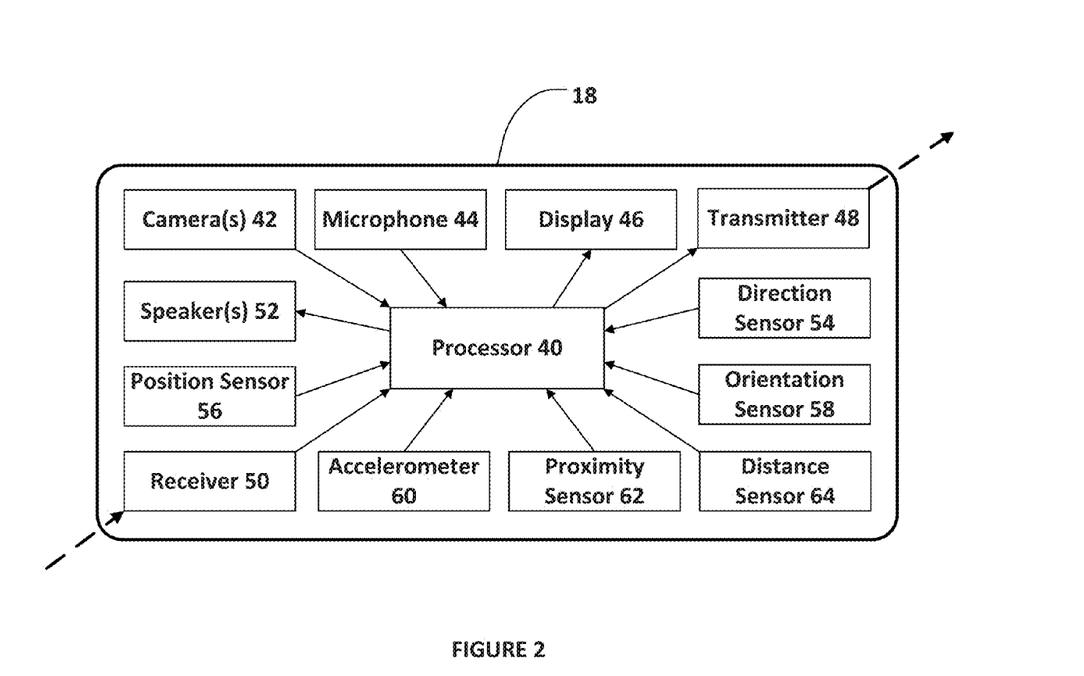
FIG. 2 is an example block diagram illustrating an augmented reality device unit that can be applied in some embodiments of the present disclosure.

FIG. 2 is a block diagram illustrating exemplary components of the communications unit 18. The communications unit 18 can include a processor 40, one or more cameras 42, a microphone 44, a display 46, a transmitter 48, a receiver 50, one or more speakers 52, a direction sensor 54, a position sensor 56, an orientation sensor 58, an accelerometer 60, a proximity sensor 62, and a distance sensor 64.

The processor 40 can be operable to receive signals generated by the other components of the communications unit 18. The processor 40 can also be operable to control the other components of the communications unit 18. The processor 40 can also be operable to process signals received by the head mount unit 14. While one processor 40 is illustrated, it should be appreciated that the term "processor" can include two or more processors that operate in an individual or distributed manner.

The head mount unit 14 can include one or more cameras 42. Each camera 42 can be configured to generate a video signal. One of the cameras 42 can be oriented to generate a video signal that approximates the field of view of the consumer wearing the head mountable unit 14. Each camera 42 can be operable to capture single images and/or video and to generate a video signal based thereon. The video signal may be representative of the field of view of the consumer wearing the head mountable unit 14.

In some embodiments of the disclosure, cameras 42 may be a plurality of forward-facing cameras 42. The cameras 42 can be a stereo camera with two or more lenses with a separate image sensor or film frame for each lens. This arrangement allows the camera to simulate human binocular vision and thus capture three-dimensional images. This process is known as stereo photography. The cameras 42 can be configured to execute computer stereo vision in which three-dimensional information is extracted from digital images. In such embodiments, the orientation of the cameras 42 can be known and the respective video signals can be processed to triangulate an object with both video signals. This processing can be applied to determine the distance that the consumer is spaced from the object. Determining the distance that the consumer is spaced from the object can be executed by the processor 40 or by the commerce server 12 using known distance calculation techniques.

Processing of the one or more, forward-facing video signals can also be applied to determine the identity of the object. Determining the identity of the object, such as the identity of a product in the retail store, can be executed by the processor 40 or by the commerce server 12. If the processing is executed by the commerce server 12, the processor 40 can modify the video signals limit the transmission of data back to the commerce server 12. For example, the video signal can be parsed and one or more image files can be transmitted to the commerce server 12 instead of a live video feed. Further, the video can be modified from color to black and white to further reduce transmission load and/or ease the burden of processing for either the processor 40 or the commerce server 12. Also, the video can cropped to an area of interest to reduce the transmission of data to the commerce server 12.

In some embodiments of the present disclosure, the cameras 42 can include one or more inwardly-facing camera 42 directed toward the consumer's eyes. A video signal revealing the consumer's eyes can be processed using eye tracking techniques to determine the direction that the consumer is viewing. In one example, a video signal from an inwardly-facing camera can be correlated with one or more forward-facing video signals to determine the object the consumer is viewing.

The microphone 44 can be configured to generate an audio signal that corresponds to sound generated by and/or proximate to the consumer. The audio signal can be processed by the processor 40 or by the commerce server 12. For example, verbal signals can be processed by the commerce server 12 such as "this product appears interesting." Such audio signals can be correlated to the video recording.

The display 46 can be positioned within the consumer's field of view. Video content can be shown to the consumer with the display 46. The display 52 can be configured to display text, graphics, images, illustrations and any other video signals to the consumer. The display 46 can be transparent when not in use and partially transparent when in use to minimize the obstruction of the consumer's field of view through the display 46.

The transmitter 48 can be configured to transmit signals generated by the other components of the communications unit 18 from the head mountable unit 14. The processor 40 can direct signals generated by components of the communications unit 18 to the commerce sever 12 through the transmitter 48. The transmitter 48 can be an electrical communication element within the processor 40. In one example, the processor 40 is operable to direct the video and audio signals to the transmitter 40 and the transmitter 48 is operable to transmit the video signal and/or audio signal from the head mountable unit 14, such as to the commerce server 12 through the network 20.

The receiver 50 can be configured to receive signals and direct signals that are received to the processor 40 for further processing. The receiver 50 can be operable to receive transmissions from the network 20 and then communicate the transmissions to the processor 40. The receiver 50 can be an electrical communication element within the processor 40. In some embodiments of the present disclosure, the receiver 50 and the transmitter 48 can be an integral unit.

The transmitter 48 and receiver 50 can communicate over a Wi-Fi network, allowing the head mountable device 14 to exchange data wirelessly (using radio waves) over a computer network, including high-speed Internet connections. The transmitter 48 and receiver 50 can also apply Bluetooth® standards for exchanging data over short distances by using short-wavelength radio transmissions, and thus creating personal area network (PAN). The transmitter 48 and receiver 50 can also apply 3G or 4G, which is defined by the International Mobile Telecommunications-2000 (IMT-2000) specifications promulgated by the International Telecommunication Union.

The head mountable unit 14 can include one or more speakers 52. Each speaker 52 can be configured to emit sounds, messages, information, and any other audio signal to the consumer. The speaker 52 can be positioned within the consumer's range of hearing. Audio content transmitted by the commerce server 12 can be played for the consumer through the speaker 52. The receiver 50 can receive the audio signal from the commerce server 12 and direct the audio signal to the processor 40. The processor 40 can then control the speaker 52 to emit the audio content.

The direction sensor 54 can be configured to generate a direction signal that is indicative of the direction that the consumer is facing. The direction signal can be processed by the processor 40 or by the commerce server 12. For example, the direction sensor 54 can electrically communicate the direction signal containing direction data to the processor 40 and the processor 40 can control the transmitter 48 to transmit the direction signal to the commerce server 12 through the network 20. By way of example and not limitation, the direction signal can be useful in determining the identity of a product(s) visible in the video signal, as well as the location of the consumer within the retail store.

The direction sensor 54 can include a compass or another structure for deriving direction data. For example, the direction sensor 54 can include one or more Hall effect sensors. A Hall effect sensor is a transducer that varies its output voltage in response to a magnetic field. For example, the sensor operates as an analog transducer, directly returning a voltage. With a known magnetic field, its distance from the Hall plate can be determined. Using a group of sensors disposing about a periphery of a rotatable magnetic needle, the relative position of one end of the needle about the periphery can be deduced. It is noted that Hall effect sensors can be applied in other sensors of the head mountable unit 14.

The position sensor 56 can be configured to generate a position signal indicative of the position of the consumer within the retail store. The position sensor 56 can be configured to detect an absolute or relative position of the consumer wearing the head mountable unit 14. The position sensor 56 can electrically communicate a position signal containing position data to the processor 40 and the processor 40 can control the transmitter 48 to transmit the position signal to the commerce server 12 through the network 20.

Identifying the position of the consumer can be accomplished by radio, ultrasound or ultrasonic, infrared, or any combination thereof. The position sensor 56 can be a component of a real-time locating system (RTLS), which is used to identify the location of objects and people in real time within a building such as a retail store. The position sensor 56 can include a tag that communicates with fixed reference points in the retail store. The fixed reference points can receive wireless signals from the position sensor 56. The position signal can be processed to assist in determining one or more products that are proximate to the consumer and are visible in the video signal. The commerce server 12 can receive position data and identify the location of the consumer in some embodiments of the present disclosure.

The orientation sensor 58 can be configured to generate an orientation signal indicative of the orientation of the consumer's head, such as the extent to which the consumer is looking downward, upward, or parallel to the ground. A gyroscope can be a component of the orientation sensor 58. The orientation sensor 58 can generate the orientation signal in response to the orientation that is detected and communicate the orientation signal to the processor 40. The orientation of the consumer's head can indicate whether the consumer is viewing a lower shelf, an upper shelf, or a middle shelf.

The accelerometer 60 can be configured to generate an acceleration signal indicative of the motion of the consumer. The acceleration signal can be processed to assist in determining if the consumer has slowed or stopped, tending to indicate that the consumer is evaluating one or more products for purchase. The accelerometer 60 can be a sensor that is operable to detect the motion of the consumer wearing the head mountable unit 14. The accelerometer 60 can generate a signal based on the movement that is detected and communicate the signal to the processor 40. The motion that is detected can be the acceleration of the consumer and the processor 40 can derive the velocity of the consumer from the acceleration. Alternatively, the commerce server 12 can process the acceleration signal to derive the velocity and acceleration of the consumer in the retail store.

The proximity sensor 62 can be operable to detect the presence of nearby objects without any physical contact. The proximity sensor 62 can apply an electromagnetic field or a beam of electromagnetic radiation such infrared and assess changes in the field or in the return signal. Alternatively, the proximity sensor 62 can apply capacitive photoelectric principles or induction. The proximity sensor 62 can generate a proximity signal and communicate the proximity signal to the processor 40. The proximity sensor 62 can be useful in determining when a consumer has grasped and is inspecting a product.

The distance sensor 64 can be operable to detect a distance between an object and the head mountable unit 14. The distance sensor 64 can generate a distance signal and communicate the signal to the processor 40. The distance sensor 64 can apply a laser to determine distance. The direction of the laser can be aligned with the direction that the consumer is facing. The distance signal can be useful in determining the distance to an object in the video signal generated by one of the cameras 42, which can be useful in determining the consumer's location in the retail store.

Figure 3:
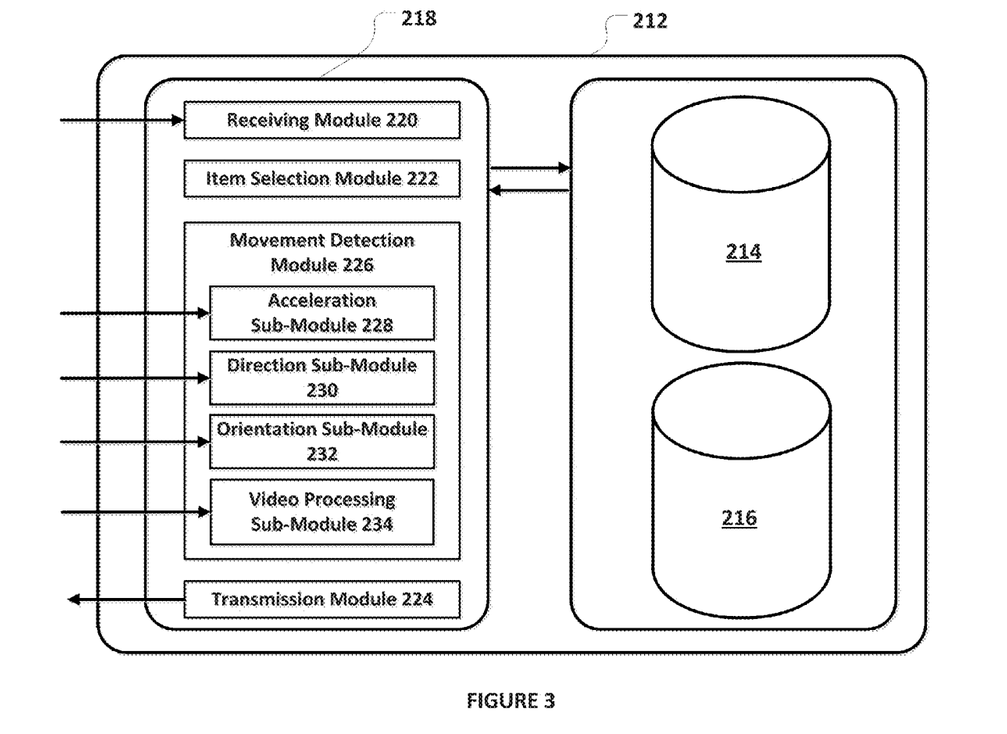
FIG. 3 is an example block diagram illustration a commerce server that can be applied in some embodiments of the present disclosure.

FIG. 3 is a block diagram illustrating a commerce server 212 according to some embodiments of the present disclosure. In the illustrated embodiment, the commerce server 212 can include a product database 214, and a shopping list database 216. The commerce server 212 can also include a processing device 218 configured to include a receiving module 220, an item selection module 222, a transmission module 224, and a movement detection module 226. The movement detection module 226 can include an acceleration sub-module 228, a direction sub-module 230, an orientation sub-module 232, and a video processing sub-module 234.

Any combination of one or more computer-usable or computer-readable media may be utilized in various embodiments of the disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

The product database 214 can include in memory the identities of a plurality of products. The plurality of products can be the products offered for sale in a retail store associated with the commerce server 212. The product database 214 can also contain a floor plan of the retail store, including the location of each of the plurality of products within the retail store. The data in the product database 214 can be organized based on one or more tables that may utilize one or more algorithms and/or indexes.

The shopping list database 216 can include memory containing one or more shopping lists generated by consumers. Each of the shopping lists includes a plurality of items offered for sale in the retail store. Each of the plurality of shopping lists can be correlated to a particular consumer. The data in the shopping list database 216 can be organized based on one or more tables that may utilize one or more algorithms and/or indexes.

The processing device 218 can communicate with the databases 214, 216 and receive one or more signals from the head mountable unit 14. The processing device 218 can include computer readable memory storing computer readable instructions and one or more processors executing the computer readable instructions.

The receiving module 220 can be configured to receive a shopping list signals from primary consumer. The receiving module 220 can be operable to receive transmissions over the network 16 and then communicate the transmissions to other components of the commerce server 212. For example, the receiving module 220 can direct shopping list signals received from a consumer to the shopping list database 216 to establish a shopping list for a particular consumer.

The item selection module 222 can access shopping lists stored in the shopping list database 216. The item selection module 222 can be configured to select an item from the shopping list of a consumer. The item selection module 222 can be configured to select items in the order that the items were added to the shopping list. The item selection module 222 can also access the product database 214 to correlate items on the shopping list with the locations of these items in the retail store. The item selection module 222 can be configured to select items in an order than minimizes the distance a consumer must travel to acquire all of the items on the shopping list.

The transmission module 224 can be configured to transmit an item signal to the consumer over the network 20. The item signal corresponds to the item from the shopping list selected by the item selection module 222. The transmission module 224 and the item selection module 222 can thus function cooperatively.

The movement detection module 226 can be configured to receive one or more movement signals from the augmented reality device worn by the consumer. A movement signal contains data that is indicative of movement of the consumer, such as gesture. The exemplary movement detection module 226 can include several sub-modules to detect gestures performed by the consumer.

The acceleration sub-module 228 of the movement detection module 226 can receive the acceleration signal from the accelerometer 60 of the head mountable unit 14. The acceleration signal can be generated by the accelerometer 60 and contain data corresponding to the rate of acceleration in the movement of the head mountable unit 14 within the retail store. Relatively high rates of acceleration of the head mountable unit 14 can be indicative of pivoting or nodding of the consumer's head. The movement detection module 226 can be configured to be responsive to relatively high rates of acceleration of the head mountable unit 14. The movement detection module 226 can be configured to be responsive to relatively rapid changes in the acceleration of the head mountable unit 14, such as can occur when a head pivots side to side or nods up and down.

By way of example and not limitation, the movement detection module 226 can respond to high rates of acceleration of the head mountable unit 14 by directing the item selection module 222 to select another item from the shopping list for transmitting to the consumer. Relatively high rates of acceleration of the head mountable unit 14 can indicate that the consumer is gesturing or has gestured. The consumer can gesture to convey that the item associated with the first or current item signal has been acquired and the consumer should be advised of the next item on the shopping list to acquire.

The direction sub-module 230 of the movement detection module 226 can receive the direction signal from the direction sensor 54 of the head mountable unit 14. The direction signal can be generated by the direction sensor 54 and contain data corresponding to a direction of the head mountable unit 14 in the retail store. Relatively rapid changes in the direction of the head mountable unit 14 can be detected by the direction sub-module 230 and can be indicative of pivoting of the consumer's head. The movement detection module 226 can be configured to be responsive to relatively rapid changes in the direction of the head mountable unit 14. For example, the movement detection module 226 can respond to relatively rapid changes in the direction of the head mountable unit 14 by directing the item selection module 222 to select another item from the shopping list for transmitting to the consumer. Relatively rapid changes in the direction of the head mountable unit 14 can thus indicate that the consumer has acquired the item associated with the first or current item signal.

The orientation sub-module 232 of the movement detection module 226 can receive the orientation signal from the orientation sensor 58 of the head mountable unit 14. The orientation signal can be generated by the orientation sensor 58 and contain data corresponding to an orientation of the consumer's head. The consumer's head can be oriented downward, upwardly, or generally parallel with the ground. Relatively rapid changes in the orientation of the consumer's head can be detected by the orientation sub-module 232 and can be indicative of nodding of the consumer's head. The movement detection module 226 can be configured to be responsive to relatively rapid changes in the orientation of the consumer's head. For example, the movement detection module 226 can respond to relatively rapid changes in the orientation of the consumer's head by directing the item selection module 222 to select another item from the shopping list from transmitting to the consumer. Relatively rapid changes in the orientation of the consumer's head can thus indicate that the consumer has acquired the item associated with the first item signal.

The movement detection module 226 can be configured to assess the acceleration, direction and orientation signals jointly. The movement detection module 226 can be configured to be responsive only when relatively rapid changes are detected in two of the signals. For example, relatively rapid acceleration of the consumer, in isolation, can be the result of movement other than gesturing. However, relatively rapid acceleration coupled with relatively rapid changes in the direction of the head mountable unit 14 is more likely the result of pivoting of the head (gesturing) than traversing movement through the retail store.

The video processing sub-module 234 of the movement detection module 226 can receive a video signal generated by the camera 42 of the head mountable unit 14. The display 46 of the head mountable unit 14 can overlap the field of view of the camera 42. Thus, the view of the consumer through the display 46 can also define the video signal generated by the camera 42 and communicated to the commerce server 212.

The video processing sub-module 234 can implement known video recognition/analysis techniques and algorithms to identify hand gestures by the consumer in front of the display 46. For example, the video processing sub-module 234 can identify the consumer's hand moving, such as movement in one rectilinear direction, rotation motion, and side-to-side or up-down movement. Each form of movement visible in the video signal can correspond to a different command for managing the shopping list. By way of example and not limitation, commands can include removing an item from the shopping list, exchanging the current item signal with another but retaining the item associated with the current item signal on the shopping list, and scrolling through the entire shopping list.

It is noted that the various processing functions set forth above can be executed differently than described above in order to enhance the efficiency of an embodiment of the present disclosure in a particular operating environment. The processor 40 can assume a greater role in processing some of the signals in some embodiments of the present disclosure. For example, in some embodiments, the processor 40 on the head mountable unit 14 could modify the video stream to require less bandwidth. The processor 40 could convert a video signal containing color to black and white in order to reduce the bandwidth required for transmitting the video signal. In some embodiments, the processor 40 could crop the video, or sample the video and display frames of interest. A frame of interest could be a frame that is significantly different from other frames, such as a generally low quality video having an occasional high quality frame. Thus, in some embodiments, the processor 40 could selectively extract video or data of interest from a video signal containing data of interest and other data. Further, the processor 40 could process audio signals received through the microphone 44, such signals corresponding to audible commands from the consumer.

Figure 4:
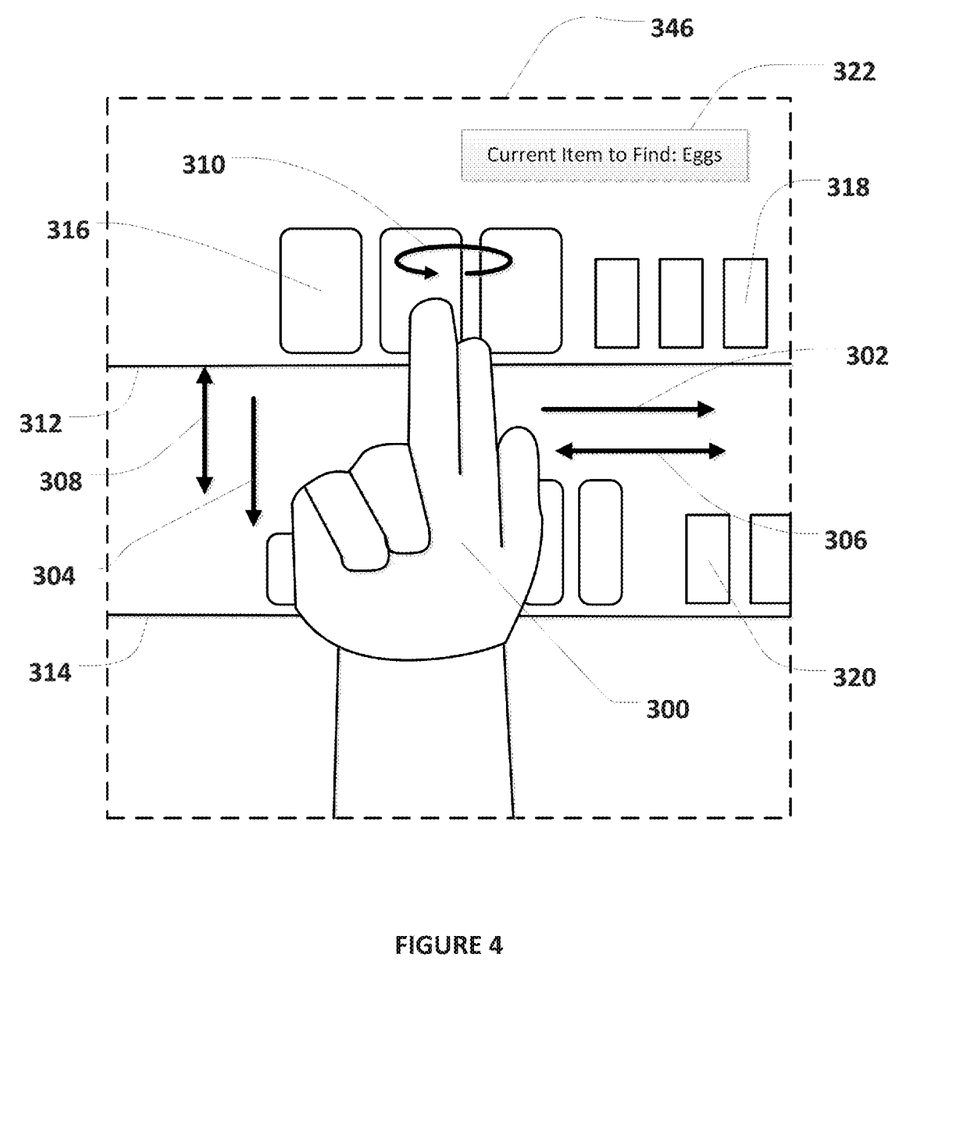
FIG. 4 is an example screen shot of the display visible with the head mountable unit during shopping in some embodiments of the present disclosure.

FIG. 4 is a screen shot of a display 346 of a head mountable unit and the video signal communicated to a commerce server during shopping in some embodiments of the present disclosure. In FIG. 4, a consumer's hand 300 is visible in the video signal. The consumer's hand can follow rectilinear movement, such as movement to the right as referenced at 302 or movement down as referenced at 304. A video processing sub-module of a movement detection module according to some embodiments of the present disclosure can also detect side-to-side movement such as referenced at 306 and up and down movement referenced at 308. A video processing sub-module of a movement detection module according to some embodiments of the present disclosure can also detect rotational movement of the hand 300 such as referenced at 310. Behind the hand 300, store shelves 312, 314 are visible supporting items 316, 318, 320. A first item signal transmitted by the commerce server has resulted in a visible indicia 322 being displayed to the consumer corresponding to the current item being sought.

The different forms of movement can correspond to different commands for managing the shopping list. By way of example and not limitation, the rectilinear movement to the right as referenced at 302 can result in the indicia 322 changing from displaying "eggs" to displaying "milk" and the item eggs being removed from the shopping list. The rectilinear movement down as referenced at 304 can result in the indicia 322 from displaying "eggs" to displaying "milk" and the item eggs being retained from the shopping list. The rectilinear movement side-to-side as referenced at 306 can result in the indicia 322 toggling between the current item being pursued, the previous item acquired, and the next item to pursue. The rectilinear movement up and down as referenced at 308 can result in the indicia 322 toggling between the items remaining on the shopping list. The rotational movement referenced at 310 can result in the indicia 322 being eliminated from the display 346. A second instance of rotational movement such as referenced at 310 can result in the indicia 322 returning to the display 346.

Figure 5:
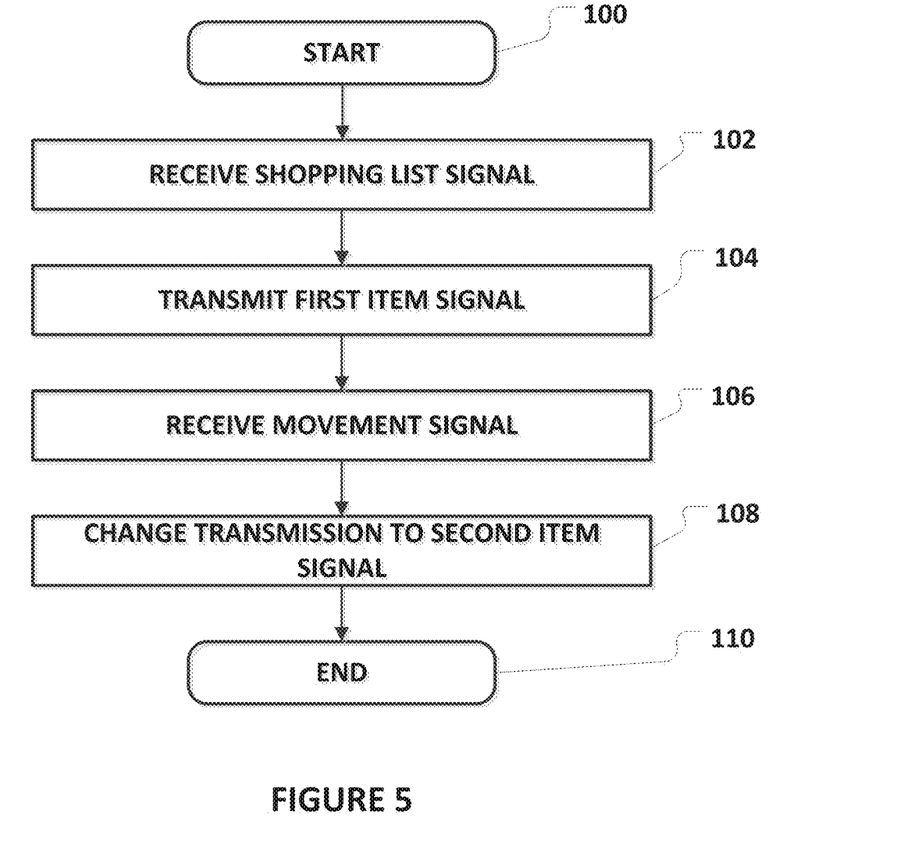
FIG. 5 is an example flow chart illustrating a method that can be carried out according to some embodiments of the present disclosure.

FIG. 5 is a flow chart illustrating a method that can be carried out in some embodiments of the present disclosure. The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

FIG. 5 is a flow chart illustrating a method that can be carried out in some embodiments of the present disclosure. The method can be executed by a commerce server. The commerce server can be located at the retail store or can be remote from the retail store. The method starts at step 100. At step 102, the commerce server can receive one or more shopping list signals from an electronic computing device to establish a shopping list of a plurality of items offered for sale in a retail store.

At step 104, the commerce server can transmit a first item signal to an augmented reality device worn by a consumer within the retail store. The first item signal corresponds to one of the plurality of items. At step 106, the commerce server can receive one or more movement signals from the augmented reality device worn by the consumer. A movement signal can correspond to movement of the consumer, such a gesture. At step 108, the commerce server can change the transmission of the item signal from transmitting the first item signal to transmitting a second item signal different from the first item signal. The change is in response to the receipt of one or more movement signals. The exemplary process ends at step 110.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The above description of illustrated examples of the present disclosure, including what is described in the Abstract, are not intended to be exhaustive or to be limitation to the precise forms disclosed. While specific embodiments of, and examples for, the present disclosure are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings of the present disclosure.

What is claimed is:

1. A computer-implemented method comprising:
   receiving, with a processing device of a commerce server, one or more shopping list signals from an electronic computing device to establish a shopping list of a plurality of items offered for sale in a retail store;
   generating, with the processing device, feedback data about a first item of the plurality of items including a distance signal generated by a laser distance sensor of the augmented reality device;
   determining, with the processing device, that the first item is closest in proximity to the consumer based on the feedback data received by the processing device from the augmented reality device;
   transmitting, with the processing device, a first item signal corresponding to the first item to an augmented reality device worn by a consumer within the retail store
   receiving, with the processing device, one or more movement signals and one or more acceleration signals from the augmented reality device corresponding to movement of the consumer;
   determining, with the processing device, that the one or more movement signals and the one or more acceleration signals indicate that the first item has been acquired by the consumer based on the rate of acceleration of the augmented reality device;
   determining, with the processing device, that a next item of the plurality of items is closest in proximity to the consumer; and
   transmitting, by the processing device, a second item signal corresponding to the next item to the augmented reality device.

2. The computer-implemented method of claim 1 wherein receiving one or more movement signals further comprises:
   receiving, with the processing device, a first movement signal containing acceleration data of the augmented reality device, a second movement signal containing direction data indicating that the augmented reality device is directed in a first direction, and a third movement signal containing direction data indicating that the augmented reality device is directed in a second direction different from the first direction, wherein the second and third movement signals are both received within a predetermined time period.

3. The computer-implemented method of claim 1 further comprising:
   removing, with the processing device, the first item from the shopping list in response to receiving the one or more movement signals.

4. The computer implemented method of claim 1 further comprising:
   retaining, with the processing device, the first item on the shopping list after changing.

5. The computer-implemented method of claim 1, further comprising:
   removing, with the processing device, the first item from the shopping list after receiving the one or more movement signals in response to a first movement signal; and retaining, with the processing device, the first item on the shopping list after transmitting the second item signal in response to a second movement signal different from the first movement signal.

6. A consumer shopping list system comprising:
   a shopping list database; and
   a commerce server having a processing device including:
   a software receiving module configured to receive one or more shopping list signals from an electronic computing device to establish a shopping list of a plurality of items offered for sale in a retail store wherein the shopping list includes a plurality of items and is stored in the shopping list database;
   a software item selection module configured to generate feedback data about a first item of the plurality of items including a distance signal generated by a laser distance sensor of an augmented reality device worn by a consumer in the retail store select an item from the shopping list, wherein the selected item is determined to be closest in proximity to the consumer of the plurality of items based on feedback data received by the processing device, wherein the feedback data includes at least a distance signal generated by a laser distance sensor of the augmented reality device;
   the software item selection module further configured to determine that the first item is closest in proximity to the consumer based on the feedback data received by the processing device from the augmented reality device;
   a software transmission module operable to transmit a first item signal corresponding to the first item containing the item selected by the item selection module to the augmented reality device worn by a consumer in a retail store;

a software movement module configured to receive one or more movement signals and one or more acceleration signals from the augmented reality device corresponding to movement of the consumer;

the software movement module further configured to determine that the one or more movement signals and the one or more acceleration signals indicate that the first item has been acquired by the consumer based on the rate of acceleration of the augmented reality device;

the software movement module further configured to determine that a next item of the plurality of items on the shopping list is closest in proximity to the consumer; and the software transmission module further configured to transmit a second item signal corresponding to the next item to the augmented reality device.

7. The consumer shopping list system of claim 6, wherein the software receiving module is further configured to receive a first movement signal containing acceleration data of the augmented reality device, a second movement signal containing direction data indicating that the augmented reality device is directed in a first direction, and a third movement signal containing direction data indicating that the augmented reality device is directed in a second direction different from the first direction, wherein the second and third movement signals are both received within a predetermined time period.

8. The consumer shopping list system of claim 6, wherein the software item selection module is further configured to remove the first item from the shopping list in response to receiving the one or more movement signals.

9. The consumer shopping list system of claim 6, wherein the software item selection module is further configured to retain the first item on the shopping list after the software transmission module transmits the second item signal.

10. The consumer shopping list system of claim 6, wherein the software item selection module is further configured to remove the first item from the shopping list after the software receiving module receives the one or more movement signals in response to a first movement signal; and wherein the software item selection module is further configured to retain the first item on the shopping list after the software transmission module transmits the second item signal in response to a second movement signal different from the first movement signal.

* * * * *